(12) United States Patent
Spearman

(10) Patent No.: US 8,195,950 B2
(45) Date of Patent: Jun. 5, 2012

(54) SECURE AND SEAMLESS WIRELESS PUBLIC DOMAIN WIDE AREA NETWORK AND METHOD OF USING THE SAME

(75) Inventor: Anthony C. Spearman, Lane, SC (US)

(73) Assignee: Optimum Path LLC, Spartanburg, SC (US)

( * ) Notice: Subject to any disclaimer, the term of this patent is extended or adjusted under 35 U.S.C. 154(b) by 900 days.

(21) Appl. No.: 10/223,255

(22) Filed: Aug. 15, 2002

(65) Prior Publication Data

US 2003/0051170 A1 Mar. 13, 2003

Related U.S. Application Data

(60) Provisional application No. 60/312,571, filed on Aug. 15, 2001.

(51) Int. Cl.
G06F 21/00 (2006.01)
(52) U.S. Cl. .......................................... 713/182; 726/27
(58) Field of Classification Search .................. 713/154, 713/162, 182; 726/15, 12, 14, 27; 380/249; 370/901
See application file for complete search history.

(56) References Cited

U.S. PATENT DOCUMENTS

| 5,199,072 | A |   | 3/1993 | White et al. |
| 5,412,647 | A | * | 5/1995 | Giroux et al. ................. 370/232 |
| 5,572,528 | A | * | 11/1996 | Shuen ............................ 370/402 |
| 5,655,148 | A |   | 8/1997 | Richman et al. |
| 5,745,884 | A |   | 4/1998 | Carnegie et al. |
| 5,796,832 | A |   | 8/1998 | Kawan |
| 5,960,074 | A |   | 9/1999 | Clark |
| 6,003,100 | A |   | 12/1999 | Lee |
| 6,023,563 | A |   | 2/2000 | Shani |
| 6,044,062 | A |   | 3/2000 | Brownrigg et al. |
| 6,058,431 | A |   | 5/2000 | Srisuresh et al. |
| 6,205,479 | B1 | * | 3/2001 | Dulai et al. .................... 709/225 |
| 6,212,613 | B1 |   | 4/2001 | Belair |
| 6,223,292 | B1 | * | 4/2001 | Dean et al. ...................... 726/28 |
| 6,236,858 | B1 | * | 5/2001 | Griffith ...................... 455/435.1 |
| 6,249,516 | B1 |   | 6/2001 | Brownrigg et al. |
| 6,272,129 | B1 | * | 8/2001 | Dynarski et al. .............. 370/356 |
| 6,275,693 | B1 |   | 8/2001 | Lin et al. |

(Continued)

OTHER PUBLICATIONS

"Wireless LAN: basic knowledge and application case studies." Transistor Gijutsu, Oct. 1, 1999 and certified translation.

(Continued)

*Primary Examiner* — Christopher Brown
(74) *Attorney, Agent, or Firm* — Technology Legal Counsel LLC

(57) ABSTRACT

A wireless public domain Wide Area Network (WPDWAN) is a system and method of providing high throughput data services to public domain customers through the use of encoded 2.4 Ghz microwave transmissions. Connecting computers to multi-point wireless bridges USi11g the 2.4 Ghz spectrum has been available for many years. However, the concept of opening the service to public domain has long been limited due to authentication, security and inevitable routing concerns. With the incorporation of a wireless router, methods of authentication through the use LDAP MAC authentication with route control and logical segmentation to preclude sniffing actions. This problem has been addressed with WPDWAN. The WPDWAN provides high data throughput connection rates to residential, commercial and mobile customers. The WPDWAN allows users to connect to the Internet backbone using a 2.4 Ghz 802.IIb standard PCMCIA card. These cards function at rates of at least 2 Mbps. The wireless card connects the computer to the Internet backbone and allows the customer to remain either stationary or be mobile within the area of coverage.

41 Claims, 4 Drawing Sheets

U.S. PATENT DOCUMENTS

| | | | |
|---|---|---|---|
| 6,292,833 | B1 | 9/2001 | Liao et al. |
| 6,295,197 | B1 | 9/2001 | Watts, Jr. et al. |
| 6,307,837 | B1 | 10/2001 | Ichikawa et al. |
| 6,311,042 | B1 | 10/2001 | DeSchrijver |
| 6,317,831 | B1 | 11/2001 | King |
| 6,351,773 | B1 * | 2/2002 | Fijolek et al. ............... 709/228 |
| 6,453,371 | B1 | 9/2002 | Hampson et al. |
| 6,463,474 | B1 * | 10/2002 | Fuh et al. .................. 709/225 |
| 6,469,991 | B1 * | 10/2002 | Chuah ...................... 370/329 |
| 6,470,453 | B1 | 10/2002 | Villhuber |
| 6,496,505 | B2 * | 12/2002 | La Porta et al. ............ 370/392 |
| 6,560,217 | B1 | 5/2003 | Peirce, Jr. et al. |
| 6,591,306 | B1 | 7/2003 | Redlich |
| 6,615,263 | B2 * | 9/2003 | Dulai et al. ............... 709/225 |
| 6,629,111 | B1 | 9/2003 | Stine et al. |
| 6,633,761 | B1 * | 10/2003 | Singhal et al. ............ 455/436 |
| 6,708,330 | B1 | 3/2004 | Moberg et al. |
| 7,035,230 | B1 * | 4/2006 | Shaffer et al. ............. 370/261 |
| 2001/0034831 | A1 * | 10/2001 | Brustoloni et al. ......... 713/151 |
| 2001/0041594 | A1 * | 11/2001 | Arazi et al. ............... 455/561 |
| 2002/0002688 | A1 * | 1/2002 | Gregg et al. ............... 713/202 |
| 2002/0007414 | A1 * | 1/2002 | Inoue et al. ............... 709/230 |
| 2002/0035699 | A1 * | 3/2002 | Crosbie .................... 713/201 |

OTHER PUBLICATIONS

Michael Taht and Greg Retkowski, "Wireless Router Howto," http://www.rage.net/wireless/wirelesshowto.html, Dec. 20, 1998. Archived on Apr. 29, 1999, by archive.org.

Doug Cinege, "Linus Router Project," Mar. 28, 1999. Archived on Apr. 29, 1999 by archive.org, see http://web.archive.org/web/1999042912745/http://www.linuxrouter.org/.

Lucent Technologies, InterNetworking Systems, "Radius for Unix Administrator's Guide," Feb. 1999.

Steve Frampton, "Linux Administration MAde Easy," the Linux Documentation Project, 1999.

TURBOCELL Trademark File History, KarlNet Inc. Filed Aug. 16, 1999.

Aironet Users Guide, Aironet Wireless Communication Inc. 1998.

Designing Airport Networks, Apple Computer Inc. 2001.

Wavepoint II Access Point, Lucent Technologies Inc. 1996.

Karlbridge & Karlrouter, Karlnet Inc. 1995.

* cited by examiner

SECURE AND SEAMLESS WIRELESS PUBLIC DOMAIN WIDE AREA NETWORK AND METHOD OF USING THE SAME

DOMESTIC PRIORITY

This patent application claims the benefit of priority under 35 U.S.C. §119 to co-pending U.S. Provisional Application Ser. No. 60/312,571, filed Aug. 15, 2001, which is incorporated, in its entirety, herein by this reference.

FIELD OF THE INVENTION

The present invention relates generally wireless public domain wide area networks and more particularly to a system and a method of providing high throughput data services to public domain customers in particular.

BACKGROUND OF THE INVENTION

With the advent of the free use policy of the microwave frequency of 2.4 Ghz, several companies set out to develop a means to connect computers to central hubs within single or multiple facilities. As a result, wireless local area networks became very popular within select segments of the economy.

However, wireless equipment was designed to service private LANs and the need to extrapolate to wide area networks has led to the manifestation of several limitations. In particular, the 2.4 Ghz frequency solution has lagged behind wired connections in terms of speed and volume of transmissions since its inception. It has also been discovered that water has a significant impact on transmissions of the 2.4 Ghz spectrum. With this in mind, it is no surprise that the foliage of trees can attenuate signal strength to unacceptable levels. Additional concerns have been raised regarding routing efficiency, public domain access control, bandwidth control, data interception, and basic security.

In reaction to these limitations, companies have recently developed wireless equipment that is capable of speeds up to 11 Mps but have been unable to address the control issues listed above. Of particular importance is security.

One form of security provided that the security information be held confidential and released to authorized users only, in the form of the network name. However, the wide dissemination of the network name makes security in public domains virtually impossible. The next generation security method employed MAC filtering. MAC filtering also proves of little consequence in a public domain because of the basic premise of an open wireless system. Traffic on a wireless system is not logically separated between nodes. Therefore, message traffic may be sniffed and decoded. MAC address spoofing is a common hacker method of creating aliases. Furthermore, the MAC address filtering occurs on the connection point to the wireless equipment. This poses two threats.

First the user can connect to the node. Once connected to the node, network traffic may be passed to other users on the node. Moreover, if any user has established a proxy server on an authorized connection, the invalid MAC address may pass through the open proxy. This step can be done with or without knowledge of the user with the proxy.

Second, although theft of service is simple with MAC addressing, another fundamental security issue arises regarding access control. In conventional wireless equipment, the MAC address filtering occurs at the connection point. The connection point typically contains approximately 400 to 500 available MAC address filters. This theory of limited MAC addresses is good for stationary customers but is very limiting on rooming customers. Without placing every customer on every connection point, mobile use is impossible.

A central MAC server could alleviate this problem, but would create the environment for an alternative security breach resulting from the clear text passage of authorized MAC addresses.

In an attempt to address the limitations of MAC addressing, vendors have provided RADIUS like solutions for MAC addressing. However, RADIUS creates a severe problem for mobility at the socket layer for the network. The user will experience short interruptions in service as they transition towers. This is fine for some forms of Internet traffic, like FTP, but Simple Mail Transfer Protocol (SMTP) and streaming video/audio are adversely effected and will lead to service interruptions.

Additionally, Wired Equivalent Protocol (WEP) is used as a security feature for precluding the interception of traffic. This protocol is of little use in a public domain. WEP is a common key code solution that allows the user to store the encryption key in clear text in the user computer. It is a very simple process to extract this key code from one computer to another in a public domain. In a private setting this code control is an operational security measure that will result in an efficient means of security. However, this operational security is not feasible in the public sector. WEP also places 40 percent of overhead into the network greatly reducing the effective bandwidth available to customers.

Finally with all these items addressed there still resides the problem with routing the entire network. Today's routing logic only addresses 3 to 5 bridge layers in any given data network. In order to properly build out a location requires many more than 3 to 5 connection points within a city. To solve the WPDWAN requires a wireless router on critical nodes.

But, even with the routing layer solved the inevitable out point arises with mobile customers. In today's network design each computer connected to the network requires an IP address. That address is assigned when the first communication of authentication is completed. We can assume that the network will not be on a contiguous network with all connection points leading to one out point. This design is neither logistically feasible on a large scale nor is it a functionally redundant design. Networks are designed to physically segment networks for redundancy. When that is completed the network has border routing involved that transports information from the LAN to the Internet. The border router has a logical segment of addresses that it routinely routes. However, mobile IP is not typically included in this method because to date most LANs have been static in nature. The IP address can be assigned through DHCP or assigned as static. In either case that IP is assigned to the logical and physical segment in which it was assigned. In order to route in another segment area the IP address must be reassigned. If this scenario is used then static IP addressing no longer becomes an option. However, if the border routers broadcast all border routes, it is possible to carry IP addresses from one physical border segment into another border segment. In that scenario both DHCP and static IP addressing are functional solutions. This method can be accomplished using Border Gateway Protocol (BGP). However, this solution requires that the wireless connection and route be one layer removed from the border router. Hence a WPDWAN with mobile solution cannot be accomplished without BGP, and a multi-point wireless router.

Physical segments will naturally be created in the build out of a cellular network that will coincide with a logic separation of routing paths. It is conceivable that each customer would receive his or her own static IP. This method is used in Europe. However, that process is cumbersome, logistically difficult to handle, and a waste of resources. DHCP is the alternative to distribute IP addresses to those users that are online and using the service. Under the auspice of DHCP submission it now becomes difficult to manage IP addresses as users pass from one physical segment to another. However, there is a dynamic network solution not innate to any operating system but developed by a third party that can dynamically shift these addresses to work between the physical and logical segmentation. Furthermore this same system offers directory services ability giving the network engineer the ability to control access at different locations with different bandwidth and rates of service.

To date, high bandwidth wireless providers have attempted to provide everything from licensed frequencies to optical transports. Many of these products have not taken hold in a wired world. The expenses associated with licensed frequencies make it difficult to build out large infrastructures. The optical solutions must have direct line of site and have proved difficult to route the network.

Wired networks today address all of these issues. Network management is passed through secure channels logically separated from user traffic to prevent administrative sniffing. Furthermore authentication is completed using RADIUS demanding a username and password, which is done at a central server as opposed to endpoint connections. Therefore updates to directory structures and routing solutions are solved when the user authenticates. In a wired network there is no need for mobile IP and the requirements for BGP are limited to redundancy issues.

Therefore, there is an existing need for a next generation of wired-like network solution to address the wireless communication challenges of today's public domain wide area networks

SUMMARY OF EXEMPLARY EMBODIMENTS

In an exemplary embodiment in accordance with the present invention, a system and method is provided that ensures users of public domain wide area networks, preferably in the 802.11 spectrum, have secure, authenticated, mobile access to the network and are able to transition network communication towers without breaking the socket layer. In the furtherance of this and other objectives, a system is provided that does not require authorization at each tower, which demands more network overhead. Rather, instead of affecting the radio connection, the system preferably affects the network connection at the out point so as to reduce overall network traffic and maintain a single socket connection. The system has distributed concentrated points of authentication, that does not interfere with the transient capabilities of the 802.11 spectrum, to reduce server loads and enhance demographic scalability.

It is a principle objective in accordance with the present invention to provide a method and system of network security for public domain wide area networks so as to provide a virtual private network between client and route controllers, preventing data interception by outside sources. In the furtherance of this and other objectives, a wireless provisioning device is provided that allows the use of individual key code via IP Security VPN. Unlike WEP, which used common key code, the present system and method reduces overhead by about 40%. Also, by using the wireless provisioning device, the present system and method allow remote control of access and bandwidth by the LDAP server. Moreover, the LDAP replication standard enables the definition of profiles for users to control bandwidth and security in a demographically scalable fashion.

An additional objective of an exemplary embodiment of the present invention is to provide a system and method that precludes, at best, and limits the duration of, at least, unauthorized use. In the furtherance of this and other objectives, the system and method employs dynamic route allocation, which provides that there is no standard route for an IP address, rather the route is determined at the time of addressing. Moreover, if conflicts arise in the system, a valid address will be reissued and client access will resume.

Yet another objective of the present invention is to provide a system and method that can utilize multiple vendor equipment. Since authentication by radius requires a client side driver, card and drive compatibility issues arise. However, a system and method in accordance with the present invention does not require a client side driver and therefore can be used promiscuously with diverse vendor equipment.

Further objectives, features and advantages of the invention will be apparent from the following detailed description taken in conjunction with the accompanying drawings.

DETAILED DESCRIPTION OF THE PREFERRED EMBODIMENTS

Figure 1:
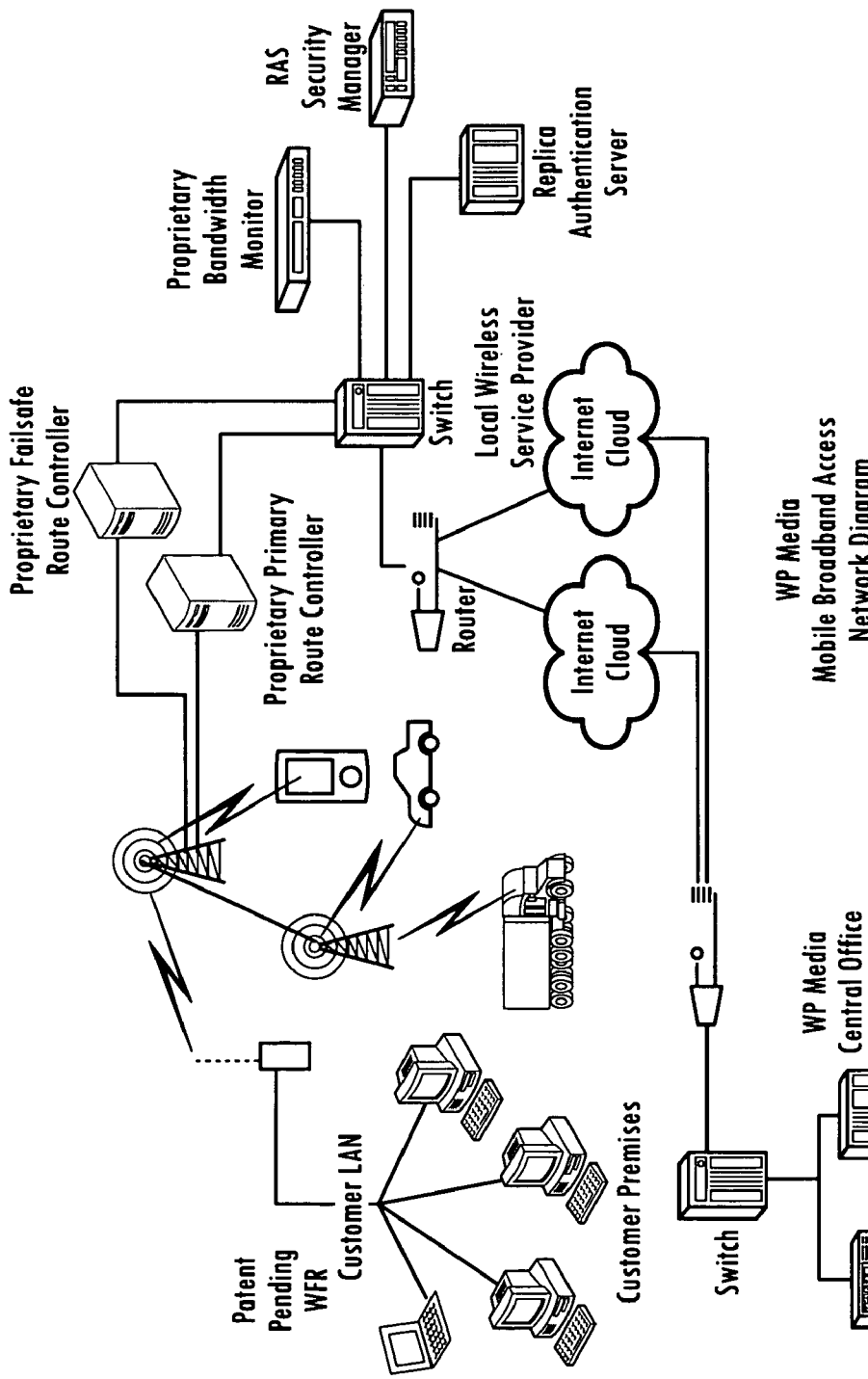
FIG. 1 is a diagrammatic view of the functionality of the integrated system, namely a mobile broadband access network diagram for how the exemplary method and system provide secure, authenticated, mobile wireless client access to a public domain wide area network utilizing the IEEE 802.11 spectrum.

IEEE 802.11 is a standard for wireless systems that operate in the 2.4-2.5 GHz ISM (industrial, scientific and medical) band. This ISM band is available worldwide and allows unlicensed operation for spread spectrum systems. For both the US and Europe, the 2,400-2,483.5 MHz band has been allocated, while for some other countries, such as Japan, another part of the 2.4-2.5 GHz ISM band has been assigned. The 802.11 standard focuses on the MAC (medium access control) protocol and PHY (physical layer) protocol for access point (AP) based networks and ad-hoc networks.

In access point based networks, the stations within a group or cell can communicate only directly to the access point. This access point forwards messages to the destination station within the same cell or through a wired distribution system to another access point, from which such messages arrive finally at the destination station. In ad-hoc networks, the stations operate on a peer-to-peer level and there is no access point or (wired) distribution system.

The 802.11 standard supports: DSSS (direct sequence spread spectrum) with differential encoded BPSK and QPSK; FHSS (frequency hopping spread spectrum) with GFSK (Gaussian FSK); and infrared with PPM (pulse position modulation). These three physical layer protocols (DSSS, FHSS and infrared) all provide bit rates of 2 and 1 Mbit/s. The 802.11 standard further includes extensions 11a and 11b. Extension 11b is for a high rate CCK (Complementary Code Keying) physical layer protocol, providing bit rates 11 and 5.5 Mbit/s as well as the basic DSSS bit rates of 2 and 1 Mbit/s within the same 2.4-2.5 GHz ISM band. Extension 11a is for a high bit rate OFDM (Orthogonal Frequency Division Multiplexing) physical layer protocol standard providing bit rates in the range of 6 to 54 Mbit/s in the 5 GHz band.

The 802.11 basic medium access behavior allows interoperability between compatible physical layer protocols through the use of the CSMA/CA (carrier sense multiple access with a collision avoidance) protocol and a random back-off time following a busy medium condition. In addition all directed traffic uses immediate positive acknowledgement (ACK frame), where a retransmission is scheduled by the sender if no positive acknowledgement is received. The 802.11 CSMA/CA protocol is designed to reduce the collision probability between multiple stations accessing the medium at the point in time where collisions are most likely occur. The highest probability of a collision occurs just after the medium becomes free, following a busy medium. This is because multiple stations would have been waiting for the medium to become available again. Therefore, a random back-off arrangement is used to resolve medium contention conflicts. In addition, the 802.11 MAC defines: special functional behavior for fragmentation of packets; medium reservation via RTS/CTS (request-to-send/clear-to-send) polling interaction; and point co-ordination (for time-bounded services).

The IEEE 802.11 MAC also defines Beacon frames, sent at a regular interval by an AP to allow wireless stations (STAs) to monitor the presence of the AP. IEEE 802.11 also defines a set of management frames including Probe Request frames which are sent by an STA, and are followed by Probe Response frames sent by the AP. Probe Request frames allow an STA to actively scan whether there is an AP operating on a certain channel frequency, and for the AP to show to the STA what parameter settings this AP is using.

IEEE 802.11 is a shared, wireless local area network (LAN) standard. It uses the carrier sense multiple access (CSMA), medium access control (MAC) protocol with collision avoidance (CA). This standard allows for both direct sequence (DS), and frequency-hopping (FH) spread spectrum transmissions at the physical layer. The maximum data rate initially offered by this standard was 2 megabits per second. A higher-speed version, with a physical layer definition under the IEEE 802.11b specification, allows a data rate of up to 11 megabits per second using DS spread spectrum transmission. The IEEE standards committee has also defined physical layer criteria under the IEEE 802.11a specification. This is based on orthogonal frequency-division multiplexing (OFDM) that will permit data transfer rates up to 54 megabits per second.

While IEEE 802.11 has experienced a rapid growth in the wireless local area network LAN environment, a number of security concerns have been raised for wireless networks in general. The IEEE 802.11 wireless LAN standard defines authentication and encryption services based on the Wired Equivalent Privacy (WEP) algorithm. The WEP algorithm defines the use of a 40-bit secret key for authentication and encryption. Many IEEE 802.11 implementations also allow 104-bit secret keys. However, the standard does not define a key management protocol, and presumes that the secret, shared keys are delivered to the IEEE 802.11 wireless station via a secure channel independent of IEEE 802.11.

The lack of a WEP key management protocol is a principal limitation to providing IEEE 802.11 security; especially in a wireless infrastructure network mode with a large number of stations. The lack of authentication and encryption services also effects operation in a wireless, ad hoc network mode where users may wish to engage in peer-to-peer collaborative communication; for example, in areas such as conference rooms.

As a result, the enhanced importance of authentication and encryption, in a wireless environment, proves the need for access control and security mechanisms that include the key management protocol specified in IEEE 802.11.

It has been shown that routing wired networks at connection nodes has long stood as the most efficient and secure means of passing Internet data. However, this method uses upgrades to old voice networks. The wired solution will never be useful for providing service to the mobile user. However, to date wireless Internet Access has been sought but security, limitation of service and mobile IP stand in the way of this solution for mobile broadband.

The WPDWAN has evolved the following features that address these concerns. The first aspect of the WPDWAN is contained in the mobile Authentication method. Using the Lightweight Directory Access Protocol (LDAP) authentication schema, a user of the present system and method is able to control the network in a manner not traditionally considered for a data network.

The LDAP device contains user profiles. That directory is broken into sections by user type such as customer and employee. These types have sub groups such as location where service is initiated and where the individual is allowed to obtain access on the network. This tree also allows for the control of bandwidth and can even be defined to the time of day that the allotted bandwidth can be distributed.

The LDAP server works in conjunction with a DHCP server that has been modified for the purpose of this network. Connection to the radio network is a complex matter that does not in itself provide network connectivity. The LDAP server tests the connection to the radio network for the Manufacture Access Code (MAC) address. This number is transmitted in each data pack and is compared to the value stored in the user profile. If the two match the DHCP server authorizes an IP address for delivery to the user connecting.

This method of authentication at this point is rather simple to penetrate. By guessing the address block served by the DHCP server the user can guess an address on the block and enter into the network. However, the present inventor made one other modification to the network in that all traffic on the local node for the wireless must pass through a route controller computer. This box has a limited number of active routes. These routes are established and removed by the DHCP software. When a lease is activated the route is created. If the lease expires the route is removed. Certain tests are run throughout the process to determine if the customer has discontinued use of the lease before the expiration of the lease. In this case the route is also removed after the lease is determined vacant for 5 minutes. The vacancy time takes into consideration the transit between cells to insure the client ample time to travel between connection points without disruption of the socket layer.

The LDAP feature provides two significant differences to the RADIUS method implement through CHAP or PPPOE. The first significant change prevents the authentication method from violating an effect of the 802.11b protocol. The LDAP route controller method allows the user to transit from tower to tower without interruption at the socket layer. This means seamless transitions between towers will result. The socket layer connection maintenance insures the user can maintain connections for streaming video and audio as well as SMTP traffic.

Scalability is also a feature an exemplary embodiment of the present invention. The LDAP standard provides for a distributed replication method of data. As the user set grows more and more requests will be made for authentication. Because the LDAP solution natively supports distributed replication, the user information can be loaded into a machine local to his border point to the Internet cloud. This information will propagate to the master LDAP server and then be propagated throughout the network. However, when requests for authentication occur on a fully operational network the request for authentication will only be made at the border point. This reduces overall network traffic to the Internet cloud and increases throughput to the user. This also reduces computer capacity in local areas by distributing the load to the replica machines at each Macro cell. This reduces cost of the system. In the case that one component of the network fails, the replication feature allows other components to pick up the failure and solve the problem until a repair can be made. This eliminates single point failures of authentication.

The next essential component of an exemplary WPDWAN is the customer premise equipment, namely the wireless provisioning device. It is a router with a wireless interface. A preferred embodiment of the wireless provisioning device is provided in co-pending U.S. Pat. No. 7,035,281, which is incorporated herein by this reference. The wireless provisioning device can control bandwidth speed and data type as well as provide firewall capability.

One aspect of the wireless provisioning router is to provide routing at each node connection point. This aspect provides for a stronger network and provides flexibility in network design. This feature allows for better network traffic management improving the overall bandwidth by reducing network latency through the optimization of routes and data packet management. Although the wireless provisioning device is capable of bridging it will be the determination of the network engineer to establish the wireless provisioning device as a bridge to the network or a router to the network. This feature gives the network engineer more flexibility to the network design. Furthermore the flexible nature of the equipment allows the user to change a leaf node that bridges into a major backbone node that routes through the use of code modification without the need to reboot. Subsequently as a node begins to grow the network engineer can upgrade that node to fit the needs of the network without banning existing customers. By inserting the cards in the slots of a chassis that contains open source LINUX as its operating system (OS), the wireless provisioning device can be configured as a router or a bridge. The routing model of LINUX is not a portion of the main operating kernel. Being a sub component of the OS, the routing module can be upgraded and modified without rebooting the system. A reboot of an advanced LINUX box may take up to 30 minutes to complete. The upgrade of a routing module in LINUX takes less than 2 seconds to reinitialize. This re-initialization is transparent to the customers attached to this box. The routing module is replaceable by abridging module if routing is not a necessity for the connection node. Routing at the connection point allows for filtering of IP addresses for either all the customers attached to that node or for an individual IP address attached to that node. Furthermore the routing module contains routing logic capable of bandwidth shaping. This process only allows certain volumes of data to be transmitted to and/or from a certain customer IP address. Because of the LDAP structure this bandwidth allotment is controlled through the profile of the user as established on the LDAP server.

The second feature of the WPDWAN revolves around the addition of more access points. Through the use of wireless provisioning device integration to the system a flexible configuration of 8 ports is introduced. The wireless provisioning device may contain up to 7 wireless connections and 1 wired connection, or 7 wired connections and 1 wireless connection or any combination as seen fit for the network. This reduces overall cost and decreases space requirements. By placing this system on a faster chip set the equipment effectively processes more data from the same point. Furthermore this feature allows the expansion of the system to develop from an outlying leaf node with little usage to a major backbone node with multiple redundancy without affecting existing customers. The user can also increase the number of potential customers to the connection point in the network by adding cards and antennas without the need for chassis changes. Because the physical configuration of the system resides in a chassis of a PC with 8 possible network slots, the wireless provisioning device can be configured with differing numbers of wireless cards and network cards. The chassis may contain up to two processors. Running the LINUX operating system the single or dual processor configuration allows for hefty data management. This processor configuration and extensive amounts of RAM memory allows the operating system to handle extensively more information than the traditional wireless connection points.

The increased functionality of the wireless provisioning device also modifies the IP assignment of the WPDWAN. As a third feature of the WPDW AN, DHCP is used to assign all mobile users, and most static users of the service. Static IP's may also be added for large static customers when IP allocation is a requirement. Because DHCP is a second layer protocol, routed networks cannot pass DHCP assignment through a router. However, the WPDWAN design incorporates the wireless provisioning device design as either a bridge or router. When acting as a bridge or switch the DHCP allocation passes through the wireless provisioning device to the customer machine seamlessly. However, when the wireless provisioning device is acting as a router the DHCP assignment must come from the wireless provisioning device itself. To logically segment the network in such a fashion as to provide each wireless provisioning device with an IP block is cumbersome. Since the routers can all slave to master BGP routers, advanced tables may be created on the BGP routers or other servers to provide dynamic segmentation to the wireless provisioning device. Therefore, segments can be created that optimized IP addressing as users enter and exit the network.

The WPDWAN centers on the security of the wireless network. Each wireless provisioning device is capable of running an ISO-4 standard encryption package capable of creating a VPN to a VPN host located at the border router. This solution prevents traffic from being intercepted while in the wireless network.

Further securing the wireless provisioning device is the method of hiding the wireless provisioning device through the route controller. All connections on the client side of the wireless provisioning device are provided routes to the wireless provisioning device, however routes to both interfaces of the wireless provisioning device are removed from the route controller. The wireless provisioning device can only be accessed when one or both of these routes are added to the route controller box. Using a secure shell telnet connection to the wireless provisioning device, message traffic and administrative information cannot be sniffed by public domain users on the network. Due to this feature WPDWAN can be made available. This feature uses a more universal management schema of telnet. The WPDWAN is administrated using secure shell telnet integrated with an HTML browser script written in, for example, PERL. Connection to all management nodes is limited to authorized IP addresses, reducing the chances of unauthorized network entries. Present day wireless equipment utilizes the SNMP V-1 protocol for the management of the connection device. SNMP V-I is limited to clear text message traffic. Any connection made to this connection point is on the same logical segment as those that are doing administrative work to the connection device. In every network solution logical segments contain all the information that is passed within that segment. Sniffing traffic on that logical segment has long been known to be a problem within networking. SNMP V-6 protocol is the typical solution to this problem while using SNMP protocol. However, SNMP V-6 is a processor intense protocol providing for extensive network overhead. By using a secure telnet connection the network overhead is reduced while increasing the security of the system. A secure telnet connection only allows certain IP's to connect to certain data ports. This limited connection structure effectively creates different logical segments within the same physical network segment. The newly created logical segment prevents the sniffing of administrative traffic by the common user. Furthermore the shell connection is managed by an HTML based GUI. To date virtually all WPDWAN have the connection points managed by proprietary Windows™ based GUIs. These GUIs allow for the management of one Node at a time. The WPDWAN GUI can manage several nodes at any given time. The user can sort through several diagnostic processes to insure problems are limited to certain areas and not pervasive throughout the network. This method of management is more intuitive and more complete previously developed WPDWAN.

The WPDWAN is capable of removing limited static MAC addressing and the inclusion of RADIUS authentication. The RADIUS authentication is tied to the MAC addressing in conjunction with a username and password. This method of authentication greatly reduces the chances of service theft and allows the user a mobile solution between cells assuming the resolution of mobile IP. Furthermore this feature lends itself to a directory services method that allows a more customized interface for the user. Using IP filtering, authorization levels and enterprise user management the WPDWAN with directory service has the ability to control bandwidth consumption, and provide a more custom service to the user. Without RADIUS authentication users connect to the network without any control from a central server. By providing RADIUS one server controls the abilities of the user to enter certain parts of the network.

The WPDWAN allows connections from both single PC cards and from other wireless provisioning devices. Through the use of this feature the same WPDWAN may contain single users and large LANs. In present day wireless WANs, the user must choose to provide service to either PC's containing the cards or to a wireless connection bridge. Commercial users would then select to use a wireless connection bridge while a residential user may choose to use a PC. Without the wireless provisioning device, multiple WPDWANs have to be erected to satisfy all types of customers. The WPDWANs incorporation of the wireless provisioning device allows the user to connect to the wireless infrastructure using either an individual PC on the Internet Cloud or another WPDWAN connection point as authorized by the connection point device. In this case one WPDWAN may be erected while satisfying all potential customer types.

The WPDWAN has the ability to deal with mobile IP. By removing the BGP routing component one layer from all the wireless routers, users are able to float between multiple out-point connections. Since the BGP is broadcast to all other BGP routers in the WPDW AN, all users may move from point to point while the routers broadcast handoffs and modify traffic flow. In other WPDWAN the user will be limited to one outflow period, unless the user reboots the machine. The BGP handoff is valid for DHCP served IP addresses or static IPs provided the IP address has been entered into the BGP table.

The WPDWAN also utilizes 2.4 Ghz unlicensed spread spectrum wireless equipment. Large scale routed WANs to date have been developed using either wired technology or some licensed frequency. In both cases the infrastructure costs have been extremely high for both the network owner and the end user. The wired WANs have not been able to provide any mobile ability. The licensed frequencies are extremely expensive and very limited in design. Furthermore efforts in these spectrums have not advanced the bandwidth transmissions to the rates we have developed.

Referring briefly to the figures where like numerals correspond like components, a system 100 is illustrated. In particular, FIG. 1 shows a diagrammatic view of the functionality of the integrated system 100, namely a mobile broadband access network diagram for how the exemplary method and system provide secure, authenticated, mobile wireless client access to a public domain wide area network utilizing the IEEE 802.11 spectrum. In a preferred embodiment in accordance with the present invention, a user of customer LAN 110 attempts to communicate with someone outside customer LAN 110 and does so by accessing wireless provisioning device 115, which preferably completes the security and authentication function. As shown in FIG. 1, route controller 120, bandwidth monitor 125, security manager 130, authentication server 135, switch 140, and router 145 can be individual components, or are preferably integrated components of the wireless provisioning device 115 resident at various points throughout the system. In the furtherance of the security and authentication objective, this architecture allows for multiple redundancies, which reduces the network overhead. Moreover, by providing such a configuration, authentication can take place locally, which enhances the speed and accuracy of network policing functions. Though illustrated with the billing server 150 and the master authentication server 155 in a remote location, the wireless provisioning device 115 is robust enough to handle traffic without reliance on the master authentication server 155. Moreover, if the master authentication server 155 has to be taken offline for routine maintenance or other reasons, the wireless provision device 115 can function and later update the master authentication server 155 and the billing server 150 once they return to service.

An additional advantage of the systems architecture is that if a user of a mobile device 160 is moving through the system in a vehicle 165, they do not have to worry about interruptions when transitioning towers 170. The socket layer connection will not be broken and as a result, a user of mobile device 160 does not have to remain stationary at their point of system entry. They can freely roam throughout the system 100 without network interruptions.

Figure 2A:
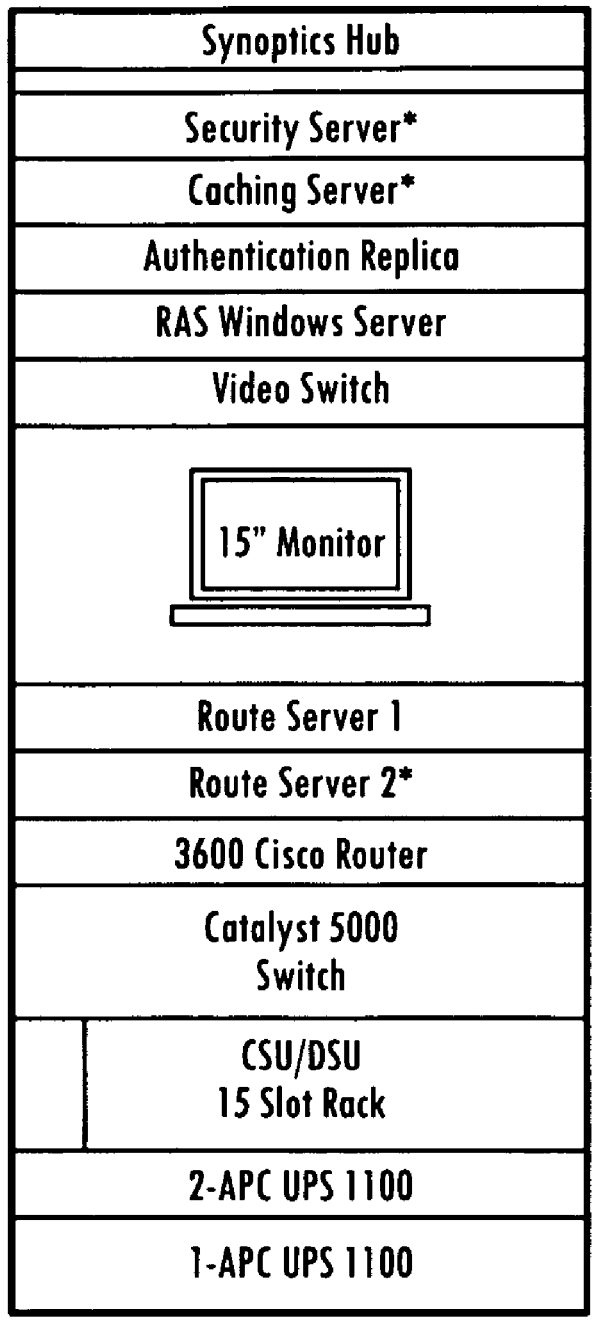
FIGS. 2a-c are a diagrammatic views (i.e., including concept, rear and front views respectively) of an exemplary control device in accordance with the present invention.
Figure 2B:
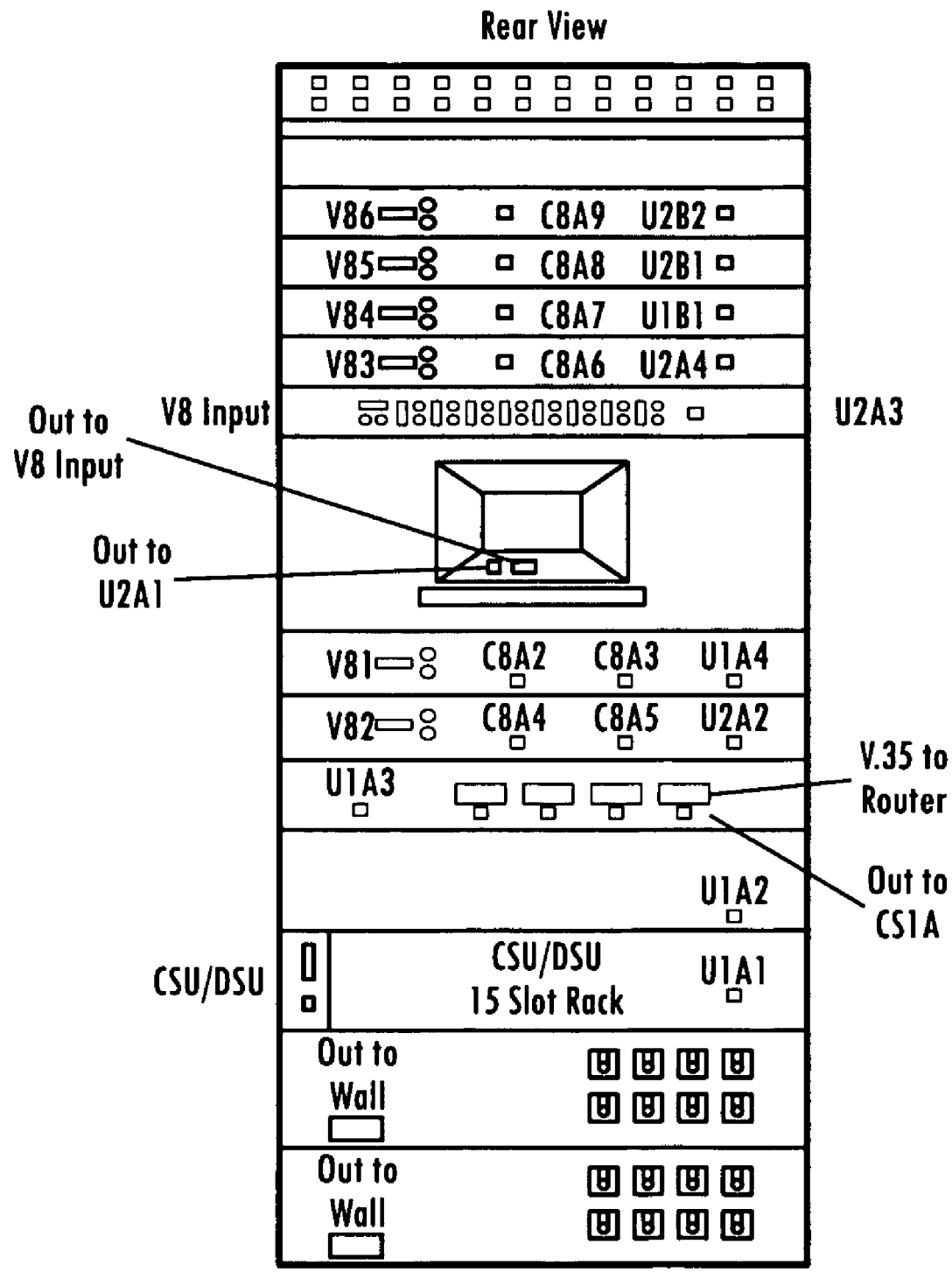
Figure 2C:
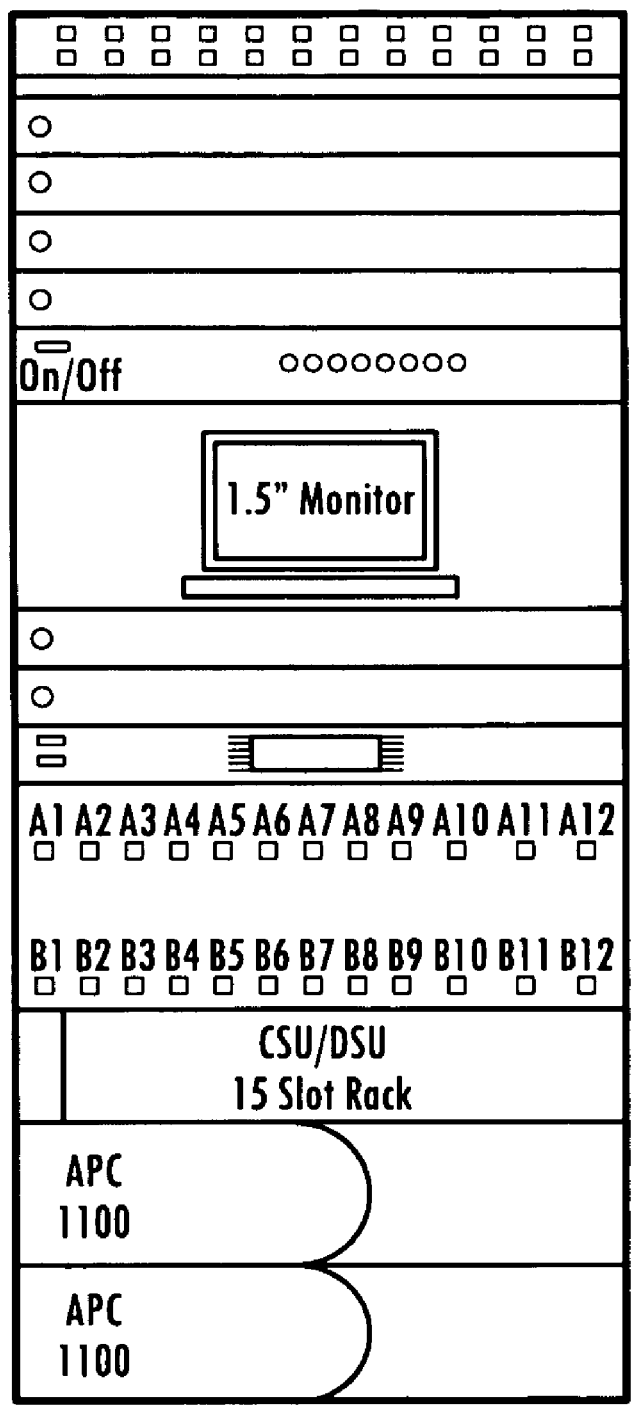

FIGS. 2a-c are a diagrammatic views (i.e., including concept, rear and front views respectively) of an exemplary control device 220 in accordance with the present invention. These FIGS show a preferred but not necessarily essential configuration of the control device 220.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes, which come within the meaning and range of equivalency of the claims, are to be embraced within their scope.

What is claimed is:

1. A method of providing secure, authenticated, mobile client access to a wireless public domain wide area network, using the 802.11 spectrum, without resort to a client side driver, comprising the steps of:
   receiving from a client a start session message containing user identity information, the start session message being received by the route controller using the communications network in accordance with a client control protocol, the start session message being sent automatically upon the client being logged on to the service provider independent of the client controller; and
   sending to the client a control message to control the clients access to use the communications network, the control message being sent from the route controller using the communications network in accordance with the client control protocol and in response to the start session message;
   wherein the receiving and/or sending step is performed by a wireless provisioning device having a chassis; at least one processor; an operating system, the operating system operably configured in the chassis to control the at least one processor, which are operatively coupled with the chassis; a packet-switched interface capable of receiving a multiplicity of inbound framed packet-data to provide inbound packets and transmitting a multiplicity of outbound framed packet-data comprising outbound packets; a channel controller coupled to the packet-switched interface that channels the inbound packets based on the inbound address information and constructs the outbound packets and channels the outbound packets with the outbound address information, the channel controller capable of being effectively connected to at least one network via the operating system; and an authenticator in operative communication with the operating system to allow authentication at the wireless provisioning device; whereby a user of a mobile computing device connects to the wireless provisioning device without having to first access the Internet; wherein said step of sending controls determines whether the client is authorized or denied access to use the communications network, wherein the control message is a session authorization message authorizing the client to use the communications network for a predetermined period of time.

2. The method of claim 1, further comprising the step of: routing or bridging the user identity information through a wireless provisioning routing device.

3. The method of claim 2, wherein the user identity information is the DHCP allocation.

4. The method of claim 1, wherein the control message is a session authorization message authorizing the client to use the communications network at a predetermined bandwidth level.

5. The method of claim 4, further comprising the step of:
   determining if the client is authorized to use the communications network based on the user identity information, and wherein said step of sending a session authorization message is only performed if the client is authorized to use the communications network.

6. The method of claim 4, further comprising the steps of:
   receiving from the client a session continuation message containing the user identity information; and
   sending to the client a continuation authorization message, based on the user identity information, authorizing the client to use the communications network for an additional predetermined period of time.

7. The method of claim 6, wherein the continuation authorization message is an additional session authorization message.

8. The method of claim 6, further comprising the step of determining if the client is authorized to continue to use the communications network based on the user identity information, and wherein said step of sending a continuation authorization message is only performed if the client is authorized to continue using the communications network.

9. The method of claim 1, further comprising the step of:
   determining if the client is authorized to use the communications network based on the user identity information; and
   wherein the control message is a deny session message if the client is not authorized to use the communications network.

10. The method of claim 1, further comprising the step of sending to the client an additional control message that instructs the client to display a message to a user.

11. The method of claim 1, further comprising the step of sending to the client an additional control message that instructs the client to receive data.

12. The method of claim 1, further comprising the steps of:
   recording information about a client session in a communications network usage log.

13. The method of claim 12, wherein the recorded information includes information associated with the user identity information and information associated with the time that the client session started.

14. The method of claim 12, further comprising the steps of:
   receiving from the client an end session message containing the user identity information; and
   recording information about the end of the client session in the usage log.

15. The method of claim 12, further comprising the step of:
   recording information about an end of the client session in the usage log if no session continuation message has been received from the client during the predetermined period of time.

16. The method of claim 12, further comprising the steps of:
   receiving from the service provider a communications network usage report; and
   comparing the communications network usage report with the communications network usage log to determine discrepancies.

17. The method of claim 1, further comprising the steps of:
   sending to the client a session termination message instructing the client to end the client session; and
   recording information about the end of the client session in a usage log.

18. The method of claim 1, wherein the communications network is a packet network.

19. The method of claim 18, wherein the packet network is the Internet and the client control protocol is an in-band protocol transmitted using transmission control protocol/Internet protocol.

20. The method of claim 9, wherein said step of determining is also based on information stored in a user database.

21. An apparatus for providing secure, authenticated, mobile wireless client access to use a wireless public domain wide area communications network, utilizing the 802.11 spectrum, comprising:
   a receiver operatively configured to receive from the client a start session message containing user identity information, the start session message being received by the client controller using the communications network in accordance with a client control protocol, the start session message being sent automatically upon the client being logged on to the service provider independent of the client controller;

a gateway operatively configured to determine if the client is authorized to access the communications network; and a route controller notifyer operatively configured to send to the client a session authorization message, the session authorization message to control the client's access to use the communications network being sent from the client controller using the communications network in accordance with the client control protocol and in response to the start session message, wherein the session authorization message controls whether the client is authorized or denied access to use the communications network, wherein the session authorization network authorizes the client to use the communications network for a predetermined period of time;

wherein the receiving apparatus is a wireless provisioning device having a microprocessor and the components operatively configured within a chassis thereof to control the microprocessor; a packet-switched interface configured to receive a multiplicity of inbound framed packet-data and to provide inbound packets and to transmit a multiplicity of outbound framed packet-data comprising outbound packets; a channel controller coupled to the packet-switched interface that is configured to channel the inbound packets based on the inbound address information and configured to construct the outbound packets and channels with the outbound address information, the channel controller capable of being effectively connected to at least one network, whereby a user of a mobile computing device connects to the wireless provisioning device without having to first access the Internet.

22. The apparatus of claim 21, wherein the communications network is the Internet and the client control protocol is an in-band protocol transmitted using transmission control protocol/Internet protocol.

23. An article of manufacture comprising a non-transitory computer readable storage medium having stored thereon instructions adapted to be executed by a processor, the instructions which, when executed, define a series of steps to control a client's access to use a secure, authenticated, mobile wireless public domain wide area communications network, using the 802.11 spectrum, said steps comprising:

receiving from the client a start session message containing user identity information, the start session message being received by the client controller using the communications network in accordance with a client control protocol, the start session message being sent automatically upon the client being logged on to the service provider independent of the client controller; and sending to the client a control message to control the clients access to use the communications network, the control message being sent from the client controller, using the communications network in accordance with the client control protocol and in response to the start session message, wherein the control message control message is a session authorization message that determine whether the client is granted or denied access to use the communications network for a predetermined period of time;

wherein the article of manufacture is a wireless provisioning device configured within a chassis thereof to control the processor; a packet-switched interface configured to receive a multiplicity of inbound framed packet-data and to provide inbound packets and to transmit a multiplicity of outbound framed packet-data comprising outbound packets; a channel controller coupled to the packet-switched interface that is configured to channel the inbound packets based on the inbound address information and configured to construct the outbound packets and channels with the outbound address information, the channel controller capable of being effectively connected to at least one network;

whereby a user of a mobile computing device connects to the wireless provisioning device without having to first access the Internet.

24. The article of manufacture of claim 23, further comprising the step of sending to the client an additional control message that instructs the client to display a message to a user.

25. The article of manufacture of claim 23, further comprising the step of sending to the client an additional control message that instructs the client to receive data.

26. The article of manufacture of claim 23, further comprising the steps of:

recording information about a client session in a communications network usage log.

27. The article of manufacture of claim 23, wherein the communications network is the Internet and the client control protocol is an in-band protocol transmitted using transmission control protocol/Internet protocol.

28. A method of using secure, authenticated, mobile client access to a wireless public domain communications network using the 802.11 spectrum having a route controller, comprising the steps of:

accessing the route controller though a service provider independent of the client controller;

sending to the route controller a start session message containing user identity information, the start session message being sent automatically upon a client being logged on to the service provider; and receiving from the route controller a control message to control whether the client is authorized or denied access to use the communications network, the control message being received by the client using the communications network in accordance with a client control protocol and in response to the start session message, wherein the control message is a session authorization message that determine whether the client is granted or denied access to use the communications network for a predetermined period of time;

wherein the receiving and/or sending step is performed by a wireless provisioning device having a chassis; at least one processor; an operating system, the operating system operably configured in the chassis to control the at least one processor, which are operatively coupled with the chassis; a packet-switched interface capable of receiving a multiplicity of inbound framed packet-data to provide inbound packets and transmitting a multiplicity of outbound framed packet-data comprising outbound packets; a channel controller coupled to the packet-switched interface that channels the inbound packets based on the inbound address information and constructs the outbound packets and channels the outbound packets with the outbound address information, the channel controller capable of being effectively connected to at least one network via the operating system; and an authenticator in operative communication with the operating system to allow authentication at the wireless provisioning device; whereby a user of a mobile computing device connects to the wireless provisioning device without having to first access the Internet.

29. The method of claim 28, further comprising the step of sending to the client an additional control message that instructs the client to display a message to a user.

30. The method of claim 28, further comprising the step of sending to the client an additional control message that instructs the client to receive data.

31. The method of claim 28, wherein said step of accessing comprises complying with a first authentication procedure performed by the service provider and said step of sending comprises complying with a second authentication procedure performed by the client controller, the second authentication procedure being independent of the first authentication procedure.

32. The method of claim 28, further comprising the step of: sending a session continuation message to the client controller prior to the end of the predetermined period of time.

33. The method of claim 28, further comprising the step of: sending an end session message to the client controller.

34. The method of claim 28, wherein the communications network is the Internet and the client control protocol is an in-band protocol transmitted using transmission control protocol/Internet protocol.

35. An article of manufacture comprising a non-transitory computer readable storage medium having stored thereon instructions adapted to be executed by a processor, the instructions which, when executed, define a series of steps to use a wireless public domain communications network using the 802.11 spectrum having a route controller, said steps comprising:

accessing the route controller through a wireless communication entry point;

sending to the route controller a start session message containing user identity information, the start session message being sent automatically upon a client being logged on to the service provider and receiving from the route controller a control message to control whether the client is authorized or denied access to use the communications network, the control message being received by the client using the communications network in accordance with a client control protocol in response to the start session message; wherein the control message is a session authorization message authorizing the client to use the communications network for a predetermined period of time;

wherein the article of manufacture is a wireless provisioning device within a chassis thereof to control the processor; a packet-switched interface configured to receive a multiplicity of inbound framed packet-data, to provide inbound packets and to transmit a multiplicity of outbound framed packet-data comprising outbound packets; a channel controller coupled to the packet-switched interface that is configured to channel the inbound packets based on the inbound address information and configured to construct the outbound packets and channels with the outbound address information, the channel controller capable of being effectively connected to at least one network;

whereby the user of a mobile computing device connects to the wireless provisioning device without having to first access the Internet.

36. The article of manufacture of claim 35, further comprising the step of sending to the client an additional control message that instructs the client to display a message to a user.

37. The article of manufacture of claim 35, further comprising the step of sending to the client an additional control message that instructs the client to receive data.

38. The article of manufacture of claim 35, wherein said step of accessing comprises complying with a first authentication procedure performed by the service provider and said step of sending comprises complying with a second authentication procedure performed by the client controller, the second authentication procedure being independent of the first authentication procedure.

39. The article of manufacture of claim 35, further comprising the step of:
   sending a session continuation message to the client controller prior to the end of the predetermined period of time.

40. The article of manufacture of claim 35, further comprising the step of:
   sending an end session message to the client controller.

41. The article of manufacture of claim 35, wherein the communications network is the Internet and the client control protocol is an in-band protocol transmitted using transmission control protocol/Internet protocol.

* * * * *